Aug. 18, 1964   C. J. DE CARO ETAL   3,144,727
EXTRACTOR AND DEFORMABLE PLASTIC CARTRIDGE
Original Filed Jan. 31, 1956   2 Sheets-Sheet 1

INVENTORS,
CHARLES J. DECARO
ROWLAND J. KOPF
By   John D. Wilkins
ATTORNEY

Aug. 18, 1964   C. J. DE CARO ETAL   3,144,727
EXTRACTOR AND DEFORMABLE PLASTIC CARTRIDGE
Original Filed Jan. 31, 1956   2 Sheets-Sheet 2

INVENTORS:
CHARLES J. DeCARO
ROWLAND J. KOPF
BY John D. Wilkins
ATTORNEY

# United States Patent Office 3,144,727
Patented Aug. 18, 1964

3,144,727
EXTRACTOR AND DEFORMABLE PLASTIC
CARTRIDGE
Charles J. De Caro, Orange, Conn., and Rowland J.
Kopf, Rocky River, Ohio, assignors to Olin Mathieson
Chemical Corporation, a corporation of Virginia
Original application Jan. 31, 1956, Ser. No. 562,444, now
Patent No. 3,048,849, dated Aug. 14, 1962. Divided
and this application Aug. 14, 1962, Ser. No. 217,513
5 Claims. (Cl. 42—25)

This invention relates to an improved assembly in explosively powered apparatus and more specifically to a plastic cartridge or cartridge adapter and gas check and a cooperating apparatus particularly adapted for use with the cartridge. This application is a division of co-pending patent application Serial No. 562,444 filed January 31, 1956 and now U.S. Patent No. 3,048,849 granted August 14, 1962.

In explosively powered apparatus using an explosive charge contained in a separate cartridge to propel a driven member through the bore of a barrel, the explosive cartridge is received in a chamber in the breech end of a barrel and a breech block seals the barrel breech and maintains the cartridge in the chamber. The cartridge may be received in a breech plug which is in turn received in a barrel chamber. Co-pending U.S. application Serial No. 355,034, filed May 14, 1953, and now U.S. Patent No. 2,945,236 granted July 19, 1960, discloses an explosively powered tool incorporating a breech plug 56. The propellant gas generated upon detonation of the cartridge should be prevented from skirting past the driven member or through seams between the breech block and barrel thereby reducing the force with which the driven member is discharged from the barrel muzzle. The invention may be applied to guns to explosively powered tools in which case the driven member may be a fastener, punch, cutter or any other working element which is driven through a barrel. The removal of the expended cartridge case from the chamber has led to the development of complex extractor mechanisms requiring involved maintenance and substantially increasing manufacturing costs.

It is therefore an object of this invention to provide a cartridge or cartridge adapter which upon firing provides a gas check to prevent the escape of the propellant gas around the driven member. Another object of this invention is to provide a cartridge or cartridge adapter which will effectively seal the seams between the breech block and barrel chamber to prevent back pressure leakage between these members upon discharge of the explosive. Another object of this invention is to provide a cartridge or cartridge adapter which will compensate for variations in the weight of different driven members so that upon detonation of the explosive each driven member will leave the barrel with substantially the same force. Another object of this invention is to provide a cartridge or cartridge adapter to receive and fire driven members of different sizes. Another object of this invention is to provide a cartridge adapter which lubricates and cleans the barrel bore during firing. Another object of this invention is to provide a cartridge or cartridge adapter in which the primer is nested in a soft deformable material too prevent accidental detonation of the explosive during handling and prior to insertion of the explosive cartridge into the chamber. Another object of this invention is to provide an explosive tool assembly including a cartridge or cartridge adapter for use with an improved and simplified extractor. Another object of this invention is to provide such a tool assembly having an arrangement including extractor means which are simple and inexpensive to manufacture and which require little or no maintenance.

Additional objects and advantages will become apparent from the following description and drawings in which.

Figure 1:
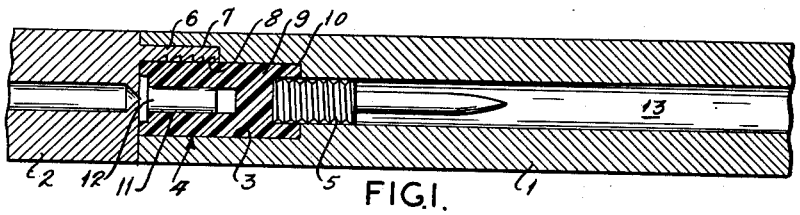
FIGURE 1 is a longitudinal sectional view of a barrel and breech showing an embodiment of an extractor and a cartridge inserted in the barrel chamber prior to discharge of the cartridge.

This invention relates to an explosively powered tool in which a cartridge or cartridge adapter is fabricated from polyethylene or other similar plastic material and is received in a firing chamber in the tool, and to special extractors to remove the expended cartridge or cartridge adapter from the chamber. The cartridge or cartridge adapter has a body of semi-resilient plastic material such as polyethylene of such size as to be received in the chamber of a tool barrel with an easy sliding fit. The body of polyethylene has a socket closed at one end and open at the other end. An explosive is retained in the cartridge socket by a closure such as a priming or detonating wafer received in the open end of the socket, the open end of the cartridge socket may be sealed in any appropriate manner with the priming charge seated in the base or bottom end of the socket or a conventional type metal cartridge seated in the socket with a primer portion flush with the open end of the plastic cartridge adapter socket. In the embodiment in which the primer is seated in the bottom of the socket the firing pin first penetrates the closure and passes through the explosive before striking and igniting the priming charge. The cartridges or cartridge adapters may be either of the unit type in which the cartridge or adapter is attached to the driven member, such as a fastener, or the cartridge or adapter may be of the independent type in which the driven member is separate from the cartridge or adapter and is positioned in the barrel bore independently of the catridge or adapter which is received in the tool barrel chamber.

One embodiment of a suitable extractor has an arm projecting into the barrel chamber. The arm has provision for grasping a portion of the cartridge or adapter after detonation of the explosive to withdraw the expended cartridge or adapter from the barrel chamber. Another embodiment of an extractor comprises a socket in the breech block which receives the rear portion of the cartridge prior to firing. This socket forms part of the cartridge chamber and is slightly smaller than the portion of the chamber in the barrel so that upon firing and subsequent expansion the cartridge or adapter will be more tightly wedged in the breech block socket than in the barrel chamber to permit the extraction of the cartridge or adapter from the barrel upon separation of the barrel and breech block. The socket is preferably tapered with the bottom of greater diameter than the mouth.

In all of the embodiments the front portion of the plastic cartridge or adapter breaks away from the rear portion and passes through the bore serving as a gas check to prevent the propellant gas from leaking past the fastener or other driven member. When the driven member is spaced from the cartridge or adapter rather than being attached thereto the front portion of the cartridge or adapter serves as a punch and engages the driven member with an impact. The rear portion of the cartridge expands into the crevices between the breech block and barrel sealing these seams and preventing loss of propellant gas pressure between the barrel and breech thus permitting utilization of of the entire propellant gas force to propel the driven member through the barrel. The barrel and breech block should engage tightly and the seam between these members should be sharp angles to minimize extrusion of the plastic into the seam which would tend to jam a breech block lock and prevent easy opening of the breech block. In cartridges or adapters including a conventional metal cartridge and primer the plastic portion of the cartridge or adapter provides a jacket for the conventional cartridge. In this respect it should be noted that the conventional type cartridge may be fabricated of substantially weaker metal and also that it is not necessary that the conventional type cartridge have the close tolerances or finish of a normal metal cartridge.

The term "adapter" refers to a holder for a conventional metal cartridge and for purposes of this description is the same device as a plastic cartridge which receives a conventional metal cartridge, the primary difference being that a "cartridge" is furnished the consumer as an integral unit ready to be inserted into the firing chamber whereas the consumer must insert a conventional metal cartridge into an "adapter." An adapter is in some respects an expendable breech plug but incorporates many features and advantages not found in a breech plug. Unless otherwise indicated the term "cartridge" will refer to a plastic cartridge and will include an "adapter." Any ductile plastic material which is sufficiently resistant to deterioration by the propellant gas and the explosive will serve adequately as a plastic cartridge or adapter but some plastics, notably polyethylene, incorporate properties other than flexibility which produce additional advantageous results in a plastic cartridge or adapter. In addition to being flexible other characteristics such as the ability to clean and lubricate the barrel bore, not deterioratively affecting the smooth barrel bore and stability over long periods of time are highly desirable. Plasticizers in many plastics evaporate so that the plastic no longer retains its original characteristics. Furthermore, plasticizers and other materials in many plastics will etch or corrode a barrel bore. Either oriented or unoriented polyethylene having a molecular weight in excess of 10,000 and preferably of 18,000 to 20,000 and a stiffness in torsion at 23° C. of about 20,000 p.s.i. is preferred. However, other plastics such as neoprene or synthetic rubber having similar flexibility or ductility are suitable to a limited extent.

Figure 2:
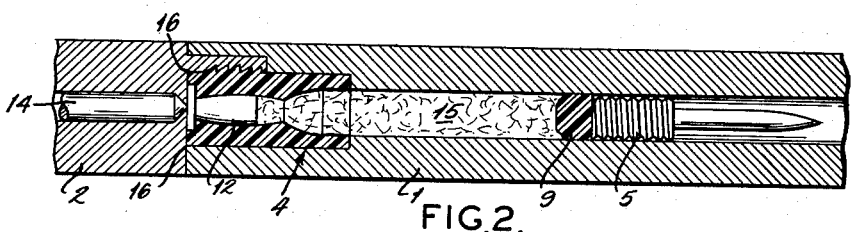
FIGURE 2 is a longitudinal sectional view of the embodiment of FIGURE 1 immediately after discharge of the cartridge.
Figure 3:
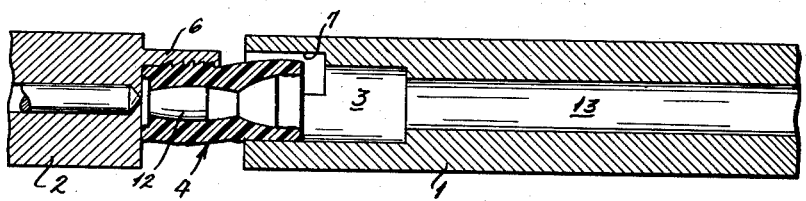
FIGURE 3 is a longitudinal sectional view of the embodimnet of FIGURE 1 showing the expended cartridge being extracted from the barrel chamber.

Referring to FIGURES 1 through 3, a tool barrel 1 and breech block 2 provide a chamber 3 for receiving a plastic cartridge 4 and fastener 5 which have been preassembled to form a unit assembly. The breech block 2 is provided with an arm 6 which is received in a cut out portion 7 of the barrel. The inner face of the arm 6 forms a portion of the chamber 3 and is provided with transverse saw-tooth grooves 8 having inclined leading surfaces to slide over the cartridge as the breech is closed, and rear portions which are substantially perpendicular to the axis of the barrel bore grip the cartridge as the arm is withdrawn from the barrel chamber. The arm 6 may be alternatively provided with prongs to penetrate the expanded cartridge, with sockets into which the cartridge may expand, or with other suitable means to firmly grip the expended cartridge rather than with teeth 8. The cartridge 4 fills the chamber 3 and engages the chamber walls with a firm sliding fit. The front portion 9 of the plastic cartridge body has a socket 10 which receives the rear end of the driven member, in this instance a threaded fastener 5. The cartridge may be either molded to the fastener or the fastener may be held tightly in the plastic cartridge by being jammed into a pre-formed socket 10. The other end of the cartridge is provided with a second socket 11 which receives a conventional type metal cartridge and primer 12. In FIGURE 2 the cartridge 4 has been discharged by the firing pin 14 striking the conventional metal cartridge primer. The expansion of the powder in the conventional type cartridge causes the metal cartridge case walls to expand outwardly against the deformable plastic cartridge body 4 distorting the plastic body portion into the grooves 8 of the extractor arm 6. The force of the explosion will permanently deform the plastic body into the grooves but the expansion of the metal cartridge case 12 more firmly anchors the plastic cartridge 4 in the grooves 8. The force of the explosion propels the fastener 5 and the front portion 9 of the plastic cartridge 4 through the barrel bore 13. After detonation the front portion 9 of the plastic cartridge 4 tears loose from the rear portion and is compressed between the high pressure propellant gas 15 and the fastener 5 causing the front portion to obturate and seal the propellant gas behind the fastener preventing the gas from skirting past the fastener. In FIGURE 3 the fastener and driving portion of the plastic body have been discharged from the barrel bore 13 and the barrel 1 and breech block 2 have been separated. The grooves 8 in the extractor arm 6 bite into the plastic cartridge 4 and cause the expended cartridge 4 to be withdrawn from the chamber 3. It should be noted that by fabricating the plastic cartridge 4 of polyethylene or some other similar material the bore 13 of the barrel is lubricated by the front portion 9 of the cartridge 4 and also scoring of the chamber 3 is prevented during the extraction of the expended cartridge from the chamber. The expansion during obturation of the front portion 9 also aids in lubricating the bore 13. It should also be noted that upon firing of the cartridge the deformable plastic material seals the seams 16 between the breech block 2 and the barrel 1 preventing the escape of high pressure propellant gas 15. These seams should fit closely and have sharp engaging edges to prevent the plastic from being forced into the seam and jam the breech opening mechanism. The cartridge by providing a much more complete seal makes available a far greater percentage of the propellant gas force to drive the fastener.

An air space is provided between the bottom of socket 11 and the mouth of the conventional metal cartridge 12 so that the pressure of the propellant gas will not rise too sharply resulting in propelling the driven member with too great a force, rupturing the cartridge and causing the plastic to extrude into the seams between the breech block and band. For a .375 inch diameter polyethylene cartridge having a .217–.220 diameter socket 11 which receives a .22 caliber long rifle blank cartridge it has been found that an extension of the socket .040 inch past the mouth of the blank cartridge gives satisfactory results. The socket extension may vary 10% and an additional air space of about .007 inch is provided between the blank cartridge wad and the mouth of the cartridge case. The polyethylene was of the previously indicated preferred type. The force with which the driven member will be propelled varies proportionately with the volume of this air space.

As mentioned previously, the plastic cartridges utilizing a conventional metal cartridge may also serve as adapters for conventional metal cartridges permitting the use of standard size conventional cartridges in tools having cartridge chambers larger than the conventional metal cartridge.

Figures 4, 5:
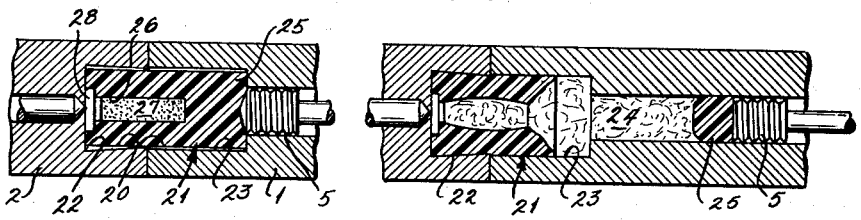
FIGURE 4 is a longitudinal sectional view of a barrel and breech showing additional embodiments of an extractor and a cartridge positioned in the barrel chamber prior to discharge of the cartridge.
FIGURE 5 is a longitudinal sectional view of the embodiment of FIGURE 4 immediately after discharge of the cartridge.
Figure 6:
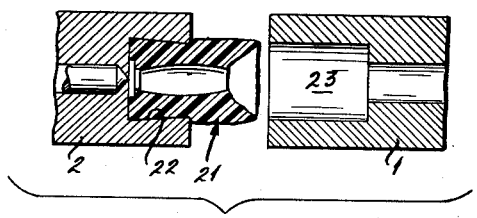
FIGURE 6 is a longitudinal sectional view of the embodiment of FIGURE 4 showing the expended cartridge being extracted from the barrel chamber.

Referring to FIGURES 4 through 6, the barrel 1 and breech block 2 cooperate to provide a chamber 20 which receives the plastic cartridge 21. In this embodiment the breech block 2 is provided with a socket 22 of slightly less diameter than the chamber 23 in the barrel. Upon firing of the cartridge 21 the force of the propellant gas 24 deforms the plastic cartridge wall into tighter engagement with the cylindrical wall of the breech block socket 22 than with the cylindrical wall in the barrel chamber 23. After firing and upon separation of the barrel 1 and the breech block 2 the cartridge 21 is held in the breech block socket 22 and is extracted from the barrel chamber 23. The socket 22 may be cylindrical but it is preferably frusto-conical with the mouth of the socket smaller than the bottom or base wall. The front portion 25 of the plastic cartridge is provided with a conical socket and the fastener 5 is not attached to the cartridge 21 prior to firing. In this embodiment the entire front portion 25 of the cartridge separates from the remainder of the cartridge and is driven though the barrel bore providing a gas check and for lubricating and cleaning the barrel. The fastener 5 may be spaced from the front of the plastic cartridge in which event the front portion 25 acts as a punch. It should also be noted that in the embodiments of FIGURES 1 through 3, the wall of the cartridge socket 10, which receives the fastener 5, is held in place in the chamber 3 during firing by the headed portion of the fastener 5 and therefore only the center portion of the cartridge is driven down the barrel bore. In the embodiment shown in FIGURES 4 through 6 there is no such restraint of the front portion 25 of the cartridge upon firing and therefore the entire front portion 25 of the cartridge is driven down the barrel bore. In this embodiment a socket 26 in the rear portion of the plastic cartridge 21 receives the explosive powder 27, rather than a conventional type metal cartridge. The powder 27 is sealed in the socket 26 by the primer 28.

Figure 7:
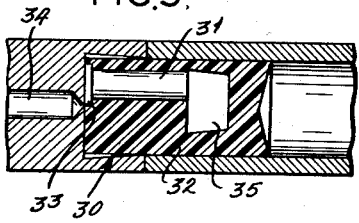
FIGURE 7 is a longitudinal sectional view of a tool and a modified cartridge for use in firing a conventional rim fire cartridge in a center fire tool or a gun.

FIGURE 7 shows a center fire tool or gun receiving another embodiment of the plastic cartridge 30. This cartridge is provided with a conventional metal type rim fire cartridge 31 positioned off center in the plastic body 32 so that a portion of the primer rim 33 of the conventional metal type cartridge 31 is positioned in the center of the plastic body in line with the firing pin hole 34 of the center fire tool or gun. The front end of fastener engaging portion of this plastic cartridge may be of any suitable type. As shown in the drawing the plastic cartridge is provided with an expansion chamber 35 into which the propellant gas expands upon firing and prior to rupturing the front portion of the cartridge. Rim fire cartridges have certain inherent advantages which make them desirable for use in explosive powered tools, however, they are more likely to be accidentally discharged in normal use than is a center fire cartridge and with the higher operating pressures experienced in explosive powered tools the rim may rupture during firing. The cartridge of FIGURE 7 eliminates these difficulties by protecting and restraining the rim of a rim fired cartridge while permitting rim fired cartridges to be used in a conventional center fire tool.

Figure 8:
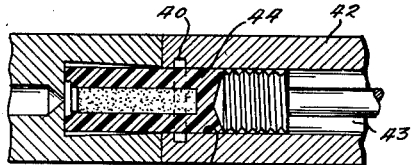
FIGURE 8 is a longitudinal sectional view of the barrel and breech of FIGURES 4-6 after modification and showing another embodiment of a cartridge positioned in the barrel chamber prior to discharge of the cartridge.
Figure 9:
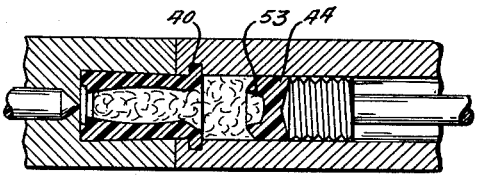
FIGURE 9 is a longitudinal sectional view of the embodiment of FIGURE 8 immediately after discharge of the cartridge.

FIGURES 8 and 9 show an embodiment similar to that of FIGURES 4 through 6 but with a circumferential groove 40 in the barrel chamber 41. It should be noted that the barrel 42 of this embodiment is not provided with an enlarged chamber but rather the barrel bore 43 and the barrel chamber are of the same diameter. However, the grooved chamber functions in the same manner in conjunction with a barrel having an enlarged chamber. As shown in FIGURE 9, upon firing the plastic cartridge its wall expands into the groove 40 causing the wall to rupture adjacent the groove so that the front portion 44 of the cartridge will always be of substantially the same dimensions with about the same mass being driven through the bore.

Figure 10:
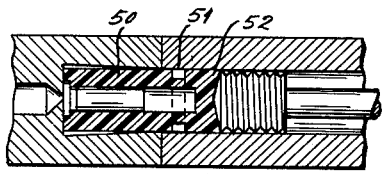
FIGURE 10 is a longitudinal sectional view of a tool with an extractor and breech similar to those shown in FIGURES 4-6 and with a barrel similar to that shown in FIG. 7 but showing another embodiment of a cartridge positioned in the barrel chamber prior to discharge of the cartridge.
Figure 11:
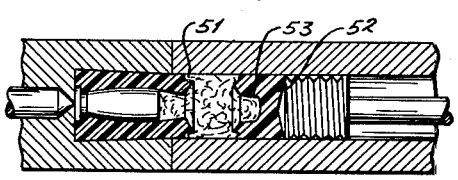
FIGURE 11 is a longitudinal sectional view of the embodiment of FIGURE 10 immediately after discharge of the cartridge.

Referring to FIGURES 10 and 11 the wall of the plastic cartridge 50 is provided with a circumferential groove 51 rather than the barrel chamber. This produces substantially the same result as the groove in the barrel chamber in controlling the size of the front portion 52 of the cartridge and assuring proper rupture of the cartridge after firing, as shown in FIGURE 10.

In the embodiments of FIGURES 8–11 the front portions 44 and 52 of the cartridge prevent the propellant gas from escaping from around the fastener 5 not only because of the obturating effect caused by compression of the front portion 44 or 52 between the fastener 5 and the propellant gas, but also because of the outward expansion of the socket portion 53 of the front portions. In these two embodiments the exraction function is the same as that described in FIGURES 4 through 6.

In all of the embodiments thus far described the powder containing sockets may or may not be provided with a conventional type metal cartridge and the extractors of FIGURES 1–3 and 4–6 are equally adapted for use with either type of cartridge. In cartridges which are not provided with the conventional type metal cartridge the primer disk may be secured in an offset at the open end of the socket with a tight interlocking fit as described with reference to FIGURES 12 through 14, below, or by an adhesive.

Figure 12:
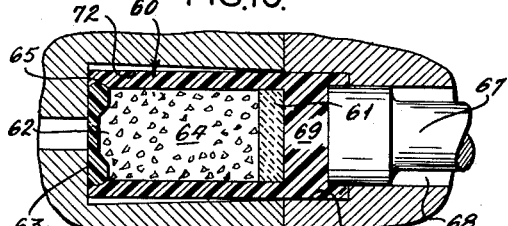
FIGURE 12 is a longitudinal sectional view of a barrel and breech similar to that of FIGURES 4-6 with modification in the firing pin stroke but showing another embodiment of a cartridge positioned in the barrel chamber prior to discharge of the cartridge.
Figure 13:
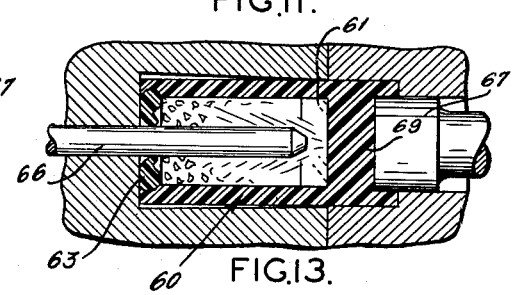
FIGURE 13 is a longitudinal sectional view of the embodiment of FIGURE 12 immediately upon detonation of the cartridge.
Figure 14:
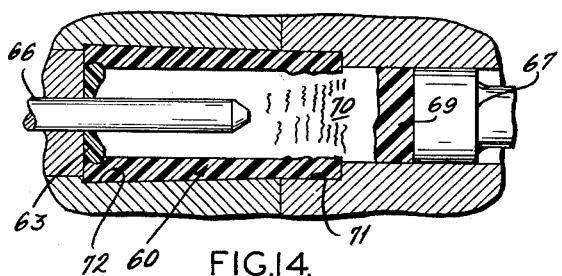
FIGURE 14 is a longitudinal sectional view of the embodiment of FIGURE 12 immediately after discharge of the cartridge.
Figure 15:
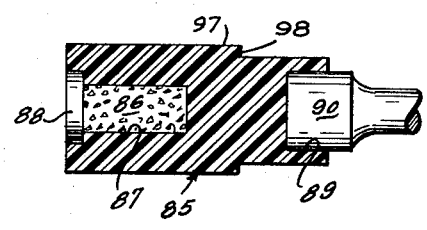
FIGURES 15 through 20 show various other embodiments of the cartridge.

FIGURES 12 through 14 show a plastic cartridge 60 similar to those previously described but with the primer 61 positioned in the base of the powder socket 62 and with sealing wafer 63 closing the open end of the socket to retain the propellant powder 64 in the socket. The open end of the socket may be sealed in any appropriate manner as by folding over the rear portion of the cartridge or by a disk held in place by a tight interlocking fit 65 as shown with or without adhesive, or by adhesive alone. Irrespective of the type of closure and seal the socket sealing portion of the cartridge must be sufficiently weak that the firing pin 66 may penetrate it. As shown in FIGURE 13, upon firing the firing pin 66 penetrates the rear end 63 of the cartridge, passes through the powder 64 and strikes the primer 61 discharging the cartridge. FIGURE 14 shows the fastener 67 being driven down the barrel bore 68 by the front portion 69 of the cartridge which again acts as a seal through the obturating effect caused by its compression between the fastener 67 and the propellant gas 70. By positioning the primer disk 61 at the base of the plastic cartridge socket 62 the disk is better protected from accidental detonation by reason of its central location in the cartridge 60. It should also be noted that this expended cartridge is more easily removed from the breech block socket after it has been extracted from the barrel chamber because the rear portion of the cartridge is free to collapse upon agitation of the expended cartridge in the breech block socket 72.

Figure 16:
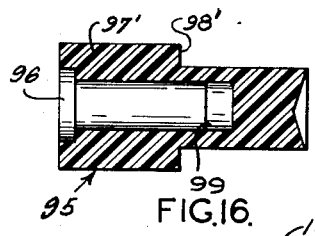
Figure 17:
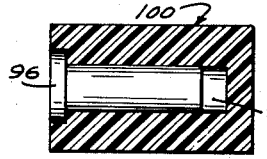
Figure 18:
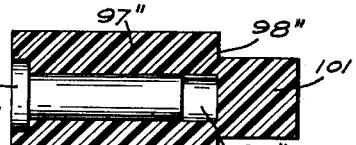
Figure 19:
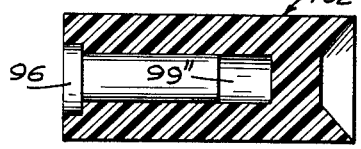
Figure 20:
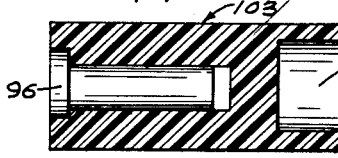

FIGURES 15 through 20 show various embodiments of the cartridge. The unit cartridge 85 in FIGURE 15 contains a propellant powder 86 in a socket 87 and the rear end of the socket is sealed by the priming cap 88. The front of this cartridge is provided with a socket 89 receiving and holding a fastener 90 or other driven member. The embodiment shown in FIGURE 16 is a sleeve cartridge 95 in which the powder and primer are provided by the conventional type metal cartridge 96 inserted into a socket 99 in the plastic cartridge. The sleeve cartridge of FIGURE 17 has a flat front end and is provided with the conventional type metal cartridge. The cartridge shown in FIGURE 18 is similar to the cartridge of FIGURE 17 except for the front portion. FIGURE 19 shows a cartridge similar to that shown in FIGURE 16 without the reduced front portion. FIGURE 20 shows a cartridge similar to FIGURE 19 but intended for use as a unit cartridge with a fastener or other driven member received in the socket in the front end of the plastic cartridge. The cartridges shown in FIGURES 15, 16, 18 have an enlarged rear portion 97 which is received in a chamber in the barrel or breech. The shoulder 98 abuts against a cooperating shoulder in the barrel chamber and reduces the length of the cartridge which may be compressed when the primer is struck by the firing pin, thus reducing the possibility of a misfire. The sockets such as 89 in FIGURE 15 permit the use of various types and sizes of driven members in the same size plastic cartridge so long as the rear portion of the driven members are of about the same size and can be held in the socket. The cartridges shown in FIGURE 17, 19 and 20 are intended for use in barrels which are not provided with an enlarged chamber.

All of the embodiments of the plastic cartridges permit control of the propellant gas pressure by varying the air space in the cartridge and this control of pressure results in the driven element being discharged from the barrel with a controlled force. The weight of the front portion of the cartridge, which is driven down the barrel bore, tends to equalize the total weight of the driven mass and therefore the force with which the driven member is discharged from the barrel.

The aforementioned embodiments provide a cartridge which facilitates the use of a simplified extractor assembly and at the same time provides a driving member for propelling a fastener or other driven element through the barrel bore and also prevents leakage of the propellant gases past the driven member and through the seams between the barrel and breech block because of the expansion of the plastic cartridge case into the seams. Fabrication of the cartridge is much simpler and less expensive. In the event metal cartridges are used they may be more cheaply fabricated because the strength and precision of a normal cartridge is not required. Particularly in the explosively powered tool field it is necessary to indicate the powder charge in a cartridge and this is usually accomplished by applying a different color to the various cartridges. With the plastic cartridge of the present type this may be accomplished by merely using different colored plastics which eliminates an added manufacturing step of painting the cartridges. It should be noted that the plastic cartridge shown in FIGURES 12–14 does not require any metal although the primer may be provided with a protective metal sheath or cup as an added safety feature.

It is to be understood that although the invention has been described with reference to certain specific embodiments, various modifications and adaptations will be apparent to one skilled in the art. It is to be particularly understood that the cartridge may assume any configuration consistent with the objects of this invention and that primers of any suitable known type may be utilized; that the unit cartridge assemblies having a driven member secured to the cartridge may have the cartridge attached in any manner consistent with the intended functions of these embodiments as set forth in the foregoing description; and that in the embodiments of the plastic cartridge incorporating a conventional type metal cartridge the conventional cartridges may be fabricated of materials other than metal as well as materials which do not take a permanent set upon discharge of the cartridge. It is to be expressly understood that the plastic cartridge or cartridge adapter is not to be limited to any specific material except as specifically set forth in the appendent claims. Various other modifications and changes or substitutions will become apparent to one skilled in the art and although the invention has been described with reference to certain specific embodiments and materials the invention is not to be so limited except as set forth in the appendent claims.

We claim:

1. In an explosive actuated assembly, the combination comprising apparatus having barrel and breech portions for defining a cartridge chamber and also comprising a cartridge containing an explosive charge for generating an actuating gas upon firing in said apparatus having said breech portion together with an extractor axially movable to a first position to form said chamber, said cartridge including a breech plug of deformable plastic extending forwardly from the cartridge rear end over at least most of the cartridge length and being slidably receivable in said chamber, said plug forming at least at the cartridge exterior an expandable sidewall extending longitudinally and circumferentially for sliding contact in at least one of said breech and said barrel portions and for expansion into sealing contact with said portions and longitudinal binding contact with said extractor, said extractor having longitudinally extending gripping means for deforming and receiving a deformed part of said plastic plug at and forwardly of said end upon said expansion, said breech portion and extractor being axially retractable from said first position to a second position for extracting the cartridge from said barrel portion.

2. In the assembly of claim 1 said extractor gripping means comprising an arm projecting forwardly and carrying a plurality of teeth and grooves into the chamber transversely of said chamber.

3. The combination of claim 2 wherein the teeth include leading faces inclined to facilitate forward movement to the first position along the plug and include intervening rear faces perpendicular to said movement to form tapered grooves and facilitate gripping upon expansion and movement from said first position to the second position.

4. In the assembly of claim 1 said extractor gripping means comprising a socket axially aligned with the chamber and having at least a part of smaller diameter than said chamber so that upon expansion the cartridge is more tightly wedged in the breech portion than in the barrel portion.

5. In the assembly of claim 1, extractor gripping means comprising a tapered socket axially aligned with the chamber so that the cartridge is more tightly wedged in the breech portion than in the barrel portion.

References Cited in the file of this patent
UNITED STATES PATENTS 2,462,889     Neidhardt _____ Mar. 1, 1949
2,766,451     Gannon _____ Oct. 16, 1956